United States Patent [15] 3,659,558
Noorlander [45] May 2, 1972

[54] TEAT CUP INFLATION

[72] Inventor: Daniel O. Noorlander, 5707 North Bond, Fresno, Calif. 93710

[22] Filed: Mar. 23, 1970

[21] Appl. No.: 21,813

[52] U.S. Cl.......................119/14.52, 119/14.36, 119/14.49
[51] Int. Cl. ..........................................................A01j 05/04
[58] Field of Search ..........................119/14.36, 14.47–14.53

[56] References Cited

UNITED STATES PATENTS

| | | | |
|---|---|---|---|
| 1,312,941 | 8/1919 | Anderson | 119/14.52 |
| 3,255,732 | 6/1966 | Raht | 119/14.52 |
| 2,502,362 | 3/1950 | Babson et al. | 119/14.52 |
| 2,621,626 | 12/1952 | Harris et al. | 119/14.52 |
| 2,997,980 | 8/1961 | Noorlander | 119/14.52 |
| 3,476,085 | 11/1969 | Noorlander | 119/14.36 |

Primary Examiner—Hugh R. Chamblee
Attorney—Beveridge & De Grandi

[57] ABSTRACT

Provided is a teat cup inflation which prevents mastitis by eliminating contaminated milk forced backwash which usually occurs during the rest cycle of automatic milking operations and at the same time provides for uniform and adequate massage of the teat. This is accomplished by providing in combination (1) a rigid air-vent plug in the wall of the inflation located just below the pulsating vacuum chamber shell and (2) an inflation having a cross-sectional area of longitudinally reinforced portions and longitudinal unreinforced portions along that section of the inflation which is enclosed within the shell, such that when the inflation collapses, there is effected along the entire length of the teat a massaging action and at the same time there is insured, upon maximum collapse and even as the inflation begins to wear out, a remaining orifice of from about 0.012 square inches to about 0.028 square inches connecting the milking vacuum to the inflation cavity immediately below the end of the teat.

9 Claims, 9 Drawing Figures

Patented May 2, 1972          3,659,558

SOURCE OF PULSATING VACUUM

SOURCE OF CONSTANT VACUUM

INVENTOR
DANIEL O. NOORLANDER
BY Beveridge & DeGrandi
ATTORNEYS

TEAT CUP INFLATION

This invention relates to teat cup inflation devices for automatic milking machines. More particularly, this invention relates to improved teat cup inflations which insure adequate teat massage and at the same time prevent any substantial amount of back-wash of milk into the teat during the rest period.

When the first milking machines were introduced to the art, they were generally based upon the principle of providing a flexible teat cup inflation consisting of an elongated flexible tube, usually of natural rubber. The tube was provided with an upper flange which held the inflation in place during milking upon the upper end of the teat near the cow's udder. Extending downwardly from this flange was an enlarged longitudinal chamber which encased the teat and which served as a milking cavity. This longitudinal chamber was then connected to a vacuum tube for milking purposes. Initially, it was thought that in order to better emulate hand-milking, a pulsating vacuum had to be provided to this inflation so that there was built into the system a milking period and a rest period to provide for decongestion of the teat and general relaxation thereof. Thus, the originally designed teat cup inflations were not primarily concerned with achieving a massaging action of the teat by the movement, both longitudinal and lateral, of the inflation device since a decongesting rest period was built into the milking vacuum system.

With the advent of modern automatic milking machinery, it was learned that a far more advantageous system could be employed by using a constant vacuum for milking. Then, in order to provide the necessary "rest period" from the constant vacuum as well as to provide for sufficient massage so as to insure adequate decongestion, etc., of the teat, there was provided about the teat inflation a shell means connected to a pulsating vacuum source. By pulsating the vacuum within the shell, the flexible inflation device was caused to pulsate below the teat end, inwardly and outwardly, so as to provide not only the necessary massage of the teat, but also a collapse of the inflation and thus a momentary rest from the constant vacuum being applied through the bottom of the inflation tube.

Although these modern inflation devices were found to provide better economy and higher production of milk over those older devices which used a pulsating vacuum on the inflation itself, these new devices gave rise to serious problems which had adverse effects upon the health of the cow and the quality of the milk obtained therefrom. One of the most serious problems which the modern "constant vacuum" milking devices cause is that of mastitis. Mastitis may be defined as an injury to the cow's udder tissue, either externally or internally, which injury becomes a focal point of potential infection when it is contacted with bacteria-carrying milk present in the inflation cavity.

Mastitis may be caused in a cow's teat, for example, by inadequate massaging of the teat through an inadequately designed cup inflation, thus to provide inadequate decongesting of the teat and pinching, especially as the inflation begins to wear out, of the teat cistern so as to injure the delicate membranes therein. Another cause of mastitis is the use of an inflation device which does not provide an adequate rest period from the constant vacuum being applied to the inflation so as to injure the teat and especially the internal tissues therein over a long period of time. A third cause of mastitis, as well as a highly significant cause of infection at the injured mastitis site is the forced backwash of milk which occurs when the inflation device is caused to collapse during its resting cycle. This forced backwash of milk actually forces contaminated milk present in the milking cavity upwardly into either the sphincter orifice or cistern of the cow. Not only does such contaminated milk cause to be presented mastitis and infection-causing micro-organism internally of the teat but the pinching forces of the collapsing inflation tend to destroy, rub and remove the delicate karetin lining of the teat orifice that has chemical and physical properties which serve to prevent bacterial invasion, thus forming a secondary site of mastitis and source of infection. Even if this backwash is limited only to the sphincter orifice, on the next rest cycle or by capillary action, the contaminated milk initially forced only as far as the sphincter orifice, is likely to be forced into the cistern. Thus, any amount of forced backwash is likely to cause mastitis and infection in a cow's teat.

Forced backwash is generally caused by three conditions which may exist in a modern "constant vacuum" milking system. The first is non-uniform operation and/or sudden fluctuations in the vacuum system which may cause temporary blockage in the milking line, thus creating a reduced pressure in the milking cavity which drains the milk back from the cavity and tends to force it upwardly against the teat.

The second cause of backwash is fully described in my U.S. Pat. No. 3,476,085 issued Nov. 4, 1969, the disclosure of which is incorporated herein by reference. Generally speaking, forced backwash, as disclosed in this patent, is caused by a momentary blockage of the air and milk passageway between the vacuum line and milking cavity when the inflation collapses during the rest cycle. The inertia of the collapsed inflation resuming its normal shape in response to the vacuum being applied in the surrounding air vacuum chamber of the shell causes a reduction in the pressure within the milk cavity and milk remaining in the inflation tube will be forced backward upwardly against the end of the teat. Even if the initial milk forced upwardly is not contaminated due to an initially sterile inflation, some of the milk baths the outer teat end which carries bacteria, thus contaminating the inner teat on the next forced backwash, and upon removal by milking vacuum, the system as a whole.

The third cause of forced backwash, it has now been found, stems from the peristalsis-like action of the walls of the inflation about the milk cavity during the rest cycle. That is to say, during the rest cycle, and especially during collapse of the inflation walls, the movement of the walls of the inflation, it has now been found, physically push and force the milk remaining in the milk cavity or which may exist in the sphincter orifice, inwardly and upwardly either into the sphincter orifice or into the cistern of the teat. This third cause, it has been further found, remains in effect, although somewhat diminished, even if a rigid orifice is provided in the inflation wall as described in the afore-cited U.S. Pat. No. 3,476,085. Therefore, even though the provision of a rigid orifice in the inflation wall as taught by this cited patent eliminates forced backwash resulting from the second cause above described, in many instances, it is inadequate to prevent forced backwash by the peristaltic action of the walls of the inflation.

An analysis of the above problems concerning mastitis reveals that the art is in need of a teat cup inflation which is designed to provide adequate massage to the teat and adequate rest from the constant vacuum being applied therein as well as to prevent forced backwash of milk into the teat and pinching of the teat end as the inflation begins to wear out.

It is a purpose of this invention to provide a teat cup inflation which solves the above need in the art by providing a uniquely designed inflation which effects adequate massage, an adequate rest period from vacuum, and at the same time prevents forced backwash of milk during collapse of the inflation, thus substantially eliminating the causes of mastitis and infection heretofore present in the operation of modern automatic milking devices. In addition, this invention provides this improved assurance not only when the inflation is new, but as it begins to wear out and becomes too flexible, as well.

In general, the subject invention provides a teat cup inflation which is formed with an internal design or is provided with a cross-section by other means, such that during the rest cycle when atmospheric pressure is admitted into the pulsating vacuum cavity between the rigid shell and the outer surface of the inflation device, the inflation device collapses such that there is maintained a sufficiently large orifice between the milking cavity immediately below the end of the teat and the constant vacuum line to provide for drainage of the milk from the milking cavity to thereby overcome the peristaltic action of the inflation walls and thus prevent forced backwash from this cause, but which is of insufficient cross-sectional area such that an adequate rest period from the vacuum is effected. Preferably, and as a generalization for most situations which occur, a cross-sectional area at maximum collapse of from about 0.012 to about 0.028 square inches is found sufficient to provide for the necessary rest period and at the same time insures against any significant amount of forced backwash of milk into the cistern or sphincter orifice of the cow's teat. In a preferred embodiment, the inflation is also provided along that area within the pulsating vacuum cavity with longitudinally extending reinforced areas and non-reinforced areas. Upon collapse of the inflation during the rest period a leverage action is thereby effected along the length of the inflation which insures the massage of the entire teat in contact with the inflation and also protects against pinching at the end of the teat even as the inflation begins to wear out.

In a still more preferred embodiment, the above-described inflation is provided with a rigid air vent in accordance with U.S. Pat. No. 3,476,085. By employing therewith a high quality vacuum system a substantially mastitis-free milking system is assured.

Figure 1:
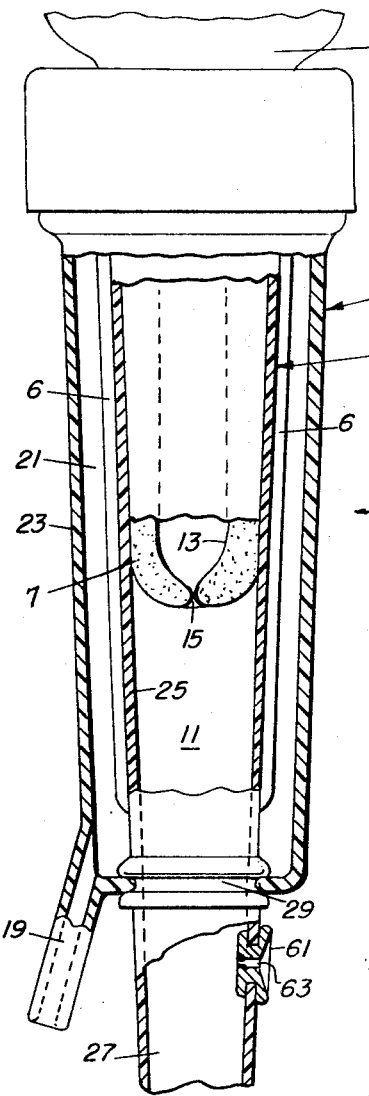
FIG. 1 is a partial section of a teat cup assembly having therein an inflation device in accordance with this invention shown in the milking position.
Figure 2:
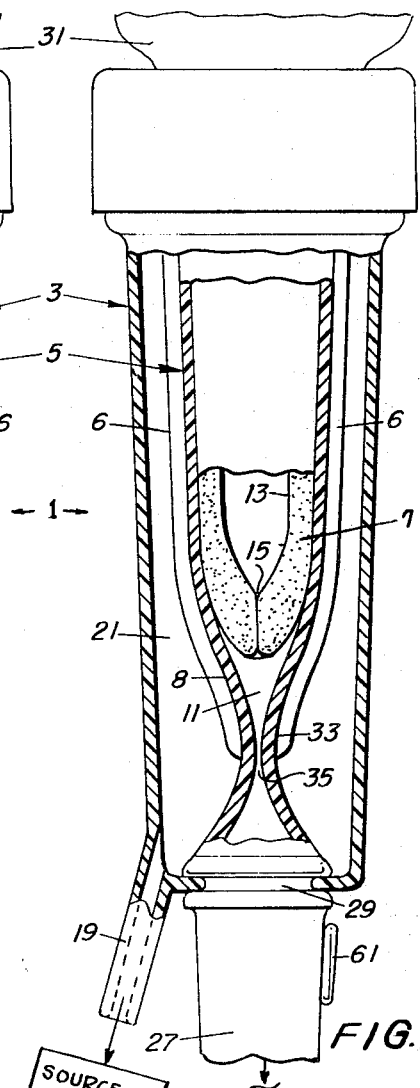
FIG. 2 is the same teat cup assembly as illustrated in FIG. 1 wherein the teat cup inflation is shown in its near collapse, or rest period position.

Referring now to the drawings, and particularly FIGS. 1 and 2, there is illustrated a teat cup assembly 1 comprised of an outer rigid shell 3 and an inner teat cup flexible inflation device 5. Within teat cup inflation device 5 there is located in a conventional manner a cow's teat 7 for milking. Teat 7 is held in a conventional manner by design of the width and mouth of the bore so as to control penetration of the teat 7 into device 5 such that a cavity 11 will be maintained below the end of teat 7 throughout the milking and rest periods. Cow's teat 7 is comprised of a cistern section 13 and a sphincter orifice 15.

Shell 3 is provided in accordance with a conventionally hermetically sealing design and a pulsating vacuum inlet orifice 19. Shell 3 is formed of a hard material, conventionally a rigid plastic or metal, so as to form a pulsating chamber 21 between shell walls 23 and the outer surface of inflation 5.

Inflation 5 is provided with longitudinally extending walls 25 which are formed in a manner hereinafter more fully described. Inflation 5 is also provided with a vacuum inlet 27 at the lower end thereof so as to allow for a constant milking vacuum to be applied through the inflation device and upon cavity 11. Inflation device 5 is also conventionally provided with vacuum sealing rings 29 so as to sealingly engage the end of inflation 5 within shell 3.

When used in operation in a conventional "constant vacuum" milking system, FIG. 1 illustrates the position inflation 5 assumes during actual milking, while FIG. 2 illustrates the position of inflation 5 during the "rest period." In operation, milk from cow's udder 31 is compressed down into cistern 13 and out through sphincter orifice 15 by a vacuum applied at 27. The milk is then delivered into cavity 11 and out through orifice 27 into a conventional milking claw (not shown). During the application of vacuum, this end of teat 7 congests with blood and thus adequate massage of the teat and an adequate interim rest period from the vacuum must be provided in order to decongest the teat and return it to its more natural condition. In order to effect such a "rest period" wherein the teat will be decongested and otherwise returned to its normal condition, a pulsating vacuum is intermittently provided through vacuum orifice 19 in shell 3 so as to collapse walls 25 below the end of teat 7 as illustrated in FIG. 2.

In accordance with this invention and as illustrated in FIG. 2, inflation device 5 is so designed, as will be hereinafter more fully explained, with longitudinally extending reinforced sections 6 and unreinforced sections 8, such that when inflation walls 25 collapse, there is provided a leverage action along substantially the entire length of the teat walls so as to provide total massage along substantially the entire length of the teat 7 which comes in contact with inflation 5. Furthermore, because of reinforced sections 6, and even when inflation 5 begins to wear out, there is provided a sufficient rigidity in walls 25 that inflation 5 does not pinch around and come in contact with the delicate membranes at the end of teat 7 so as to cause damage thereto. In this respect cavity 11 is maintained even at maximum collapse of walls 25 during the rest period such that substantially no contact of the inflation 5 is experienced at the horizontal end of teat 7 especially near sphincter orifice 15, the point at which the most delicate tissues exist.

By providing the above-described leverage action through the use of longitudinally extending reinforced sections and longitudinally extending unreinforced sections in walls 25, mastitis due to inadequate massage (e.g., inadequate decongestion) of teat 7 and the pinching of inflation 5 against the delicate end of teat 7 is prevented. In addition, the leverage action effected also provides a gentle closing of sphincter orifice 15 during the rest period so as to provide not only for full "rest" from vacuum but an added protection against forced backwash of any small amount of milk in cavity 11 or sphincter orifice 15 which may remain upon the collapse of wall 25 at point 33.

Although this same leverage action can be provided by manufacturing walls 25 totally rigid, it is preferred to provide it with longitudinally extending rigid sections and longitudinally extending flexible or non-rigid sections therebetween. By so doing, the rigid sections may actually be used as stop mechanisms upon collapse of walls 25 during the rest period to provide an orifice 35 between cavity 11 and vacuum withdrawal tube 27 which is sufficiently large in cross-sectional area to allow for the drainage of milk caught in cavity 11 even at maximum collapse. By designing inflation 5 in this manner, forced backwash of milk along with the contaminating micro-organisms found therein due to the peristaltic action of walls 25, back into sphincter orifice 15 and cistern 13 is substantially prevented.

The exact cross-sectional area of orifice 35 necessary to prevent backwash of milk due to this peristalsis-like action of walls 25 as hereinbefore described, will of course depend upon the actual design of the inflation device employed, the amount of vacuum being pulled by the milking machine, the size of cavity 11 after full insertion of the teat therein, and the like. Thus, the actual optimal area for insuring against forced backwash will differ given different field conditions. It has been found through field testing, however, that for substantially all normal field situations if the inflation device is designed such that upon maximum collapse an orifice having a cross-sectional area of about 0.012 square inches to about 0.028 square inches is maintained, the danger of forced backwash due to peristalsis-like action will be substantially eliminated.

As hereinbefore described, this invention, in its most preferred embodiment, contemplates the use of a rigid air vent in the inflation wall described in cited U.S. Pat. No. 3,476,085. Referring to FIGS. 1 and 2, there is provided in inflation wall 25 immediately below sealing rings 29 a rigid plug 61 having therein an air vent 63. Calibrated air vent 63 is provided with a larger diameter at its outer end and a smaller diameter at its inner end preferably of a size ranging from a number 60 to 80 standard drill. Different size orifices are desirable for different types of milk hose lifts, the higher the lift the more air that is necessary. The outer portion of the vent has a somewhat larger diameter so as to prevent blockage thereof. Air vent 63 is normally of sufficient size to admit at least about one-eighth cubic ft. of air measured at one-half atmosphere per minute so that the total air admitted into a cluster of four teat cup assemblies will approximate one-half cubic ft. Air flow of one air vent should preferably not exceed about one-eighth cubic ft./min. because a greater flow will tend to induce rancidity and operating difficulties such as excessive foaming. The minimum air flow necessary to provide for sufficient removal of milk will, to some extent, depend upon the speed and volume of milk coming from the orifice of the teat. Generally, if a minimum air flow of about one-eighth cubic ft. of air per minute is maintained, a good safety margin for milk removal will be assured, it being realized that smaller air vents will be operative but will not have the degree of safety that about one-eighth cubic ft./min. affords.

By providing an air vent as above-described, the second cause of forced backwash i.e., due to pressure drop in cavity 11, is virtually eliminated. Then, by the choice of high quality non-fluctuating vacuum systems now present on the market, a system is achieved by this invention which virtually eliminates the problem of forced backwash and thus one of the major causes of mastitis and infection in milk cows.

In addition to the advantages above-described with respect to the unique inflation device of this invention, it has also been found that by providing the leverage action as described in combination with the maintenance of an orifice of sufficient size even at maximum collapse, there is achieved additional insurance against infection even as the inflation device begins to wear out. That is to say, the leverage action provides for a longer wearing inflation device over those known devices currently in use and, at the same time, provides that as the inflation begins to wear out, it will begin to wear out more uniformly along the length thereof. Thus, when wear is finally detected, any problem leading to mastitis caused thereby, will be maintained at a minimum since such a problem is not concentrated at or in the milking cavity near the teat end.

From the above it can be seen that this invention contemplates the use of leverage action means or orifice maintaining means alone in an inflation in order to effect the improved results achieved therefrom. HOwever, as is readily apparent, when an inflation device as described above uses both of these means as well as an air vent in the inflation wall there is provided a new and unique teat cup inflation which substantially decreases or virtually eliminates all causes of mastitis related to teat cup inflation pressures and which not only materially increases the life of the inflation but minimizes causes of mastitis related to inflation wear as well. Furthermore, when such an inflation is used in combination with high quality non-fluctuating vacuum set-ups, there is formed an automatic milking system which substantially decreases, and in many instances, virtually eliminates mastitis caused by the mechanical operation of modern milking systems.

Referring now to FIGS. 4 through 9, there are disclosed various embodiments of the unique teat cup inflation device in accordance with this invention. As can be seen, these embodiments maintain the prescribed cross-sectional area of the orifice at maximum collapse by internal or interior contact, in these instances, of the walls.

Figure 3:
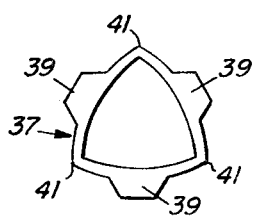
FIG. 3 is a cross-sectional view of one embodiment of a teat cup inflation device in accordance with this invention in open position.

In FIG. 3 there is illustrated a teat cup inflation device 37 formed of longitudinally extending reinforced sections 39 and, located intercommunicatingly therebetween, unreinforced flexible sections 41. Device 37 may be used as teat cup inflation device 5 in FIGS. 1 and 2. As illustrated more fully in FIG. 4, when pulsating air (vacuum) is admitted into vacuum chamber 21 of shell 3 to collapse teat cup device 5 during the rest period, and if teat cup inflation device 37 is being used as the cross-sectional design of teat cup 5 and reinforced sections 39 are analogous to sections 6, there is provided a leverage action due to the longitudinally extending reinforcing section 39 (or 6 as shown in FIGS. 1–2). Because of the interaction of the size of flexible sections 41 and reinforcing sections 39, there is maintained even at total collapse an orifice 43 extending between chamber 11 and constant vacuum line 27. By designing sections 39 appropriately, a cross-sectional area of between about 0.012 and 0.028 square inches may be maintained even at total collapse.

Figure 4:
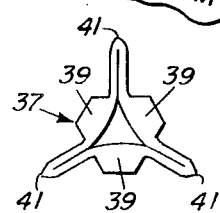
FIG. 4 is a cross-sectional view of the teat cup inflation device of FIG. 3 in closed position.

As can be seen with specific reference to FIG. 4, sections 39 engage as stop mechanisms upon maximum collapse to thereby insure that drain orifice 43 will always be present. Furthermore, because sections 39 are reinforced sections, they will be the last sections to wear out, thus prolonging the life of the inflation device 37 as well as insuring only minimal damage to the teats even if the device is allowed to wear out while still in use.

Figure 5:
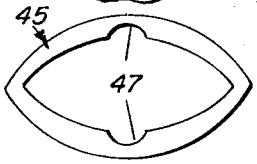
FIG. 5 is a cross-sectional view of another embodiment of a teat cup inflation in accordance with this invention in open position.
Figure 6:
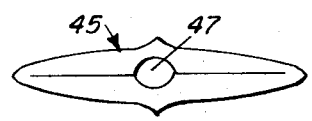
FIG. 6 is a cross-sectional view of the embodiment of FIG. 5 except in closed position.

FIGS. 5 and 6 illustrate a further embodiment of a cross-sectional area of a teat cup inflation device in accordance with this invention. In this embodiment, teat cup inflation device 45 is not provided with reinforcing sections and thus does not have built within it the leverage action as contemplated by this invention. However, the cross-sectional design of the inflation device 45 is provided with longitudinally extending incuts 47 which provide an orifice 49 which has the desired cross-sectional area as described above.

Figure 7:
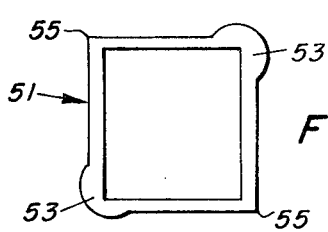
FIG. 7 is a cross-sectional view of still another embodiment of a teat cup inflation in accordance with this invention in open position.
Figure 8:
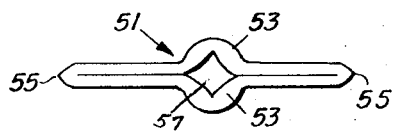
FIG. 8 is a cross-sectional view of the embodiment of FIG. 6 in closed position.

As illustrated in FIGS. 7 through 8, a further embodiment of this invention provides a cross-sectional area of a teat cup inflation device 51 to insure both a drain orifice and the leverage action. Teat cup inflation device 51 is provided with longitudinally extending reinforcing members 53 and flexible non-reinforced sections 55 extending therebetween. By providing a rectangular cross-sectional area inwardly within device 51 such that two opposing corners of the rectangular shape are formed within reinforcing sections 53, an orifice 57 of the desired cross-sectional area is maintained during the rest period to prevent any substantial forced backwash of milk into the cow's teat due to the peristalsis-like action of the walls of the inflation.

Figure 9:
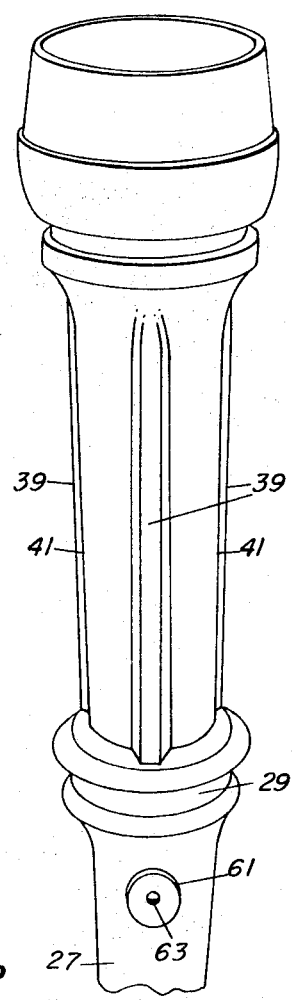
FIG. 9 is a perspective view of the embodiment of FIG. 3.

The longitudinal nature of the reinforced and unreinforced sections as contemplated by this invention are best illustrated in FIG. 9. As shown, reinforced sections 39 are provided along the outer faces of the inflation walls. Extending between reinforced sections 39, and thus forming the remainder of the walls are unreinforced sections 41. Sections 39 and 41 extend from the top of the inflation located within the shell, i.e., that point at which the teat first contacts the walls downwardly to a point just above vacuum sealing ring 29. As illustrated, the inflation is provided with a rigid air vent orifice 63 immediately below ring 29. Referring to previous discussion, by designing sections 39 of suitable width, the inward edges thereof act as stop mechanisms during collapse of the walls during the rest period to maintain an orifice as described above. As further illustrated in the drawings, particularly FIGS. 3–8, the collapsible portions of the inflation walls are joined together by relatively sharp corners which as illustrated substantially fully collapse without looping during operation.

Once given the above disclosure, many other cross-sectional areas may be designed in order to fullfil the functions of the unique teat cup inflation device in accordance with this invention. In this respect, it is clear that the orifice may be maintained by design of the cross-sectional area of the inflation itself or it may be provided by an extraneous member such as an expandable ring, a series of wires, or the like inserted and engaged at a proper location within the milking cavity. All such means for maintaining the orifice during collapse are contemplated by this invention.

The teat cup inflation devices of this invention may be formed of conventional materials such as natural rubber, plastics, and the like. In addition, the teat cup inflation devices of this invention have applicability to all modern milking machines wherein there is applied to the inflation cup a constant milking vacuum and wherein there is provided on the outside of said inflation device a pulsating vacuum to cause said device to expand and contract in a milking period and a rest period. Generally speaking, for most inflation devices in accordance with this invention a constant milking vacuum of from about 25 mmHg to about 37.5 mmHg is desirable in order that the limits of the cross-sectional area of the orifice maintained will be optimized to insure against forced backwash of milk into the cow's teat. In addition, a pulsating vacuum of from about 25 mmHg to about 37.5 mmHg that drops to 0 mmHg is also desirable for this same reason.

Once given the above disclosure, many other features, variations and modifications thereof will become apparent to those skilled in the art and thus are considered to be a part of this invention, the scope of which is to be determined by the claims which hereinafter follow.

I claim:

1. A teat cup inflation device adapted to be used in an automatic milking system which includes a source of constant vacuum, a source of pulsating vacuum, and a teat cup assembly which includes said teat cup inflation device and a teat cup inflation shell, there being defined a pulsating vacuum chamber between said inflation and said shell, said teat cup inflation device being provided with integral wall means extending through said shell and defining a longitudinal teat receiving chamber, and milk discharge means in flow communication with said wall means to allow a milking vacuum from said source of constant vacuum to be pulled within said chamber, said wall means being adapted to collapse to a point below the end of a cow's teat inserted therein, and being provided about said point with interior contact means for maintaining an orifice at maximum collapse of a sufficiently large cross-sectional area to reduce the amount of forced backwash of milk into a cow's teat, but of a sufficiently small cross-sectional area to allow for adequate rest from said milking vacuum, said cross-sectional area of said orifice at maximum collapse being about 0.012–0.028 square inches.

2. A teat cup inflation device according to claim 1 wherein said walls are provided with longitudinally extending reinforced sections and longitudinally extending non-reinforced sections such that upon collapse of said walls there is effected a leverage action which provides massage along substantially the entire length of that portion of a cow's teat inserted in said chamber.

3. A teat cup inflation device in accordance with claim 2 wherein said longitudinally extending reinforced sections are longitudinal ribs of sufficient width such that upon maximum collapse of said walls at said point of collapse, said ribs prevent full collapse of said walls and thereby maintain said orifice.

4. In an automatic milking system comprising a source of constant vacuum, a source of pulsating vacuum, and a teat cup assembly comprised of a teat cup inflation and a teat cup inflation shell, there being defined a pulsating vacuum chamber between said inflation and said shell, the improvement comprising as said teat cup inflation, a teat cup inflation as defined in claim 1.

5. The improvement of claim 4 wherein said wall means are provided with longitudinally extending reinforced sections and longitudinally extending non-reinforced sections such that upon collapse of said walls there is effected a a leverage action which provides massage along substantially the entire length of that portion of a cow's teat inserted in said chamber.

6. The improvement of claim 5 wherein said teat cup inflation also includes a calibrated air vent extending through a wall of said milk discharge means, said vent being located in said means at a point below the lowest juncture of said inflation and said shell which juncture defines the lowest point of said pulsating vacuum chamber, said air vent being adapted to admit a metered amount of air therethrough sufficient to reduce the amount of forced backwash of milk into a cow's teat.

7. An improvement in accordance with claim 6 wherein said constant vacuum source is sufficient to create a vacuum within said teat cavity of from about 25 mmHg to about 37.5 mmHg.

8. A teat cup inflation device according to claim 1 wherein said non-reinforced sections are connected by relatively sharp corners which substantially fully collapse without looping during operation.

9. A teat cup inflation device according to claim 1 which also includes a calibrated air vent extending through a wall of said milk discharging means, said vent being located in said means at a point below the lowest juncture of said inflation and said shell which juncture defines the lowest point of said pulsating vacuum chamber, said air vent being adapted to admit a metered amount of air therethrough sufficient to reduce the amount of forced backwash of milk into a cow's teat.

* * * * *